United States Patent
Sako et al.

(10) Patent No.: US 8,384,940 B2
(45) Date of Patent: Feb. 26, 2013

(54) IMAGE FORMING APPARATUS, IMAGE FORMING SYSTEM AND CONTROL METHODS THEREOF

(75) Inventors: Ritsuto Sako, Kawasaki (JP); Keiko Usui, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 12/719,812

(22) Filed: Mar. 8, 2010

(65) Prior Publication Data

US 2010/0238493 A1    Sep. 23, 2010

(30) Foreign Application Priority Data

Mar. 23, 2009 (JP) ................................. 2009-070985
Dec. 18, 2009 (JP) ................................. 2009-288421

(51) Int. Cl.
*G06F 15/00* (2006.01)

(52) U.S. Cl. ........................ 358/1.15; 709/220
(58) Field of Classification Search .................. 358/1.15
See application file for complete search history.

(56) References Cited

U.S. PATENT DOCUMENTS

2004/0034654 A1* 2/2004 Simpson et al. .......... 707/103 R
2009/0327729 A1* 12/2009 Rhodes et al. ................ 713/171

FOREIGN PATENT DOCUMENTS

JP        2004-164233 A      6/2004

* cited by examiner

*Primary Examiner* — Saeid Ebrahimi Dehkordy
(74) *Attorney, Agent, or Firm* — Fitzpatrick, Cella, Harper & Scinto

(57) ABSTRACT

This invention provides an image forming apparatus which prevents unauthorized printing without impairing the user's convenience. To accomplish this, upon reception of the print job, the image forming apparatus determines if the print job is a storage target job. If the print job is a storage target job, the image forming apparatus temporarily stores the print job in a memory without starting printing. The image forming apparatus creates and transmits a URL which is required to access a Web server included in the self apparatus and is uniquely assigned to the print job, to the external apparatus which transmitted the print job. After that, when an access to the URL is generated, the image forming apparatus starts printing the temporarily stored print job.

14 Claims, 12 Drawing Sheets

THIS MAIL IS AUTOMATIC TRANSMISSION MAIL
FROM PRINTER "SALES DEPARTMENT PRINTER 01"

FOLLOWING PRINT JOB IS RECEIVED:
PRINTER: SALES DEPARTMENT PRINTER 01 ～901
JOB NAME: 2008 SALES REPORT.doc ～902
USER: ganon ～903

CLICK FOLLOWING URL IF YOU PERMIT EXECUTION OF THIS PRINT JOB.
http://eigyobu-printer01/job_manage.html?8g93jk9sd ～904

※ PRINT JOB IS AUTOMATICALLY DISCARDED
   IF NO ACCESS IS MADE FOR 10 MINUTES

| JOB ID (1001) | JOB NAME (1002) | USER NAME (1003) | UNIQUE CHARACTER STRING DESIGNATED IN URL (1004) |
|---|---|---|---|
| 1 | 2008 SALES REPORT.doc | ganon | 8g93jk9sd |
| 2 | ***PRODUCT BROCHURE.pdf | sato | 634joier9sj |

THIS MAIL IS AUTOMATIC TRANSMISSION MAIL
FROM PRINTER "SALES DEPARTMENT PRINTER 01"

FOLLOWING PRINT JOB IS RECEIVED:
PRINTER: SALES DEPARTMENT PRINTER 01 ～901
JOB NAME: 2008 SALES REPORT.doc ～902
USER: ganon ～903

CLICK FOLLOWING URL IF YOU PERMIT EXECUTION OF THIS PRINT JOB.
http://eigyobu-printer01/job_manage.html?8g93jk9sd ～904

PRINT JOB IS ALSO AUTOMATICALLY DISCARDED
WHEN NO ACCESS IS MADE FOR 10 MINUTES
http://eigyobu-printer01/job_manager.html?723tuie49s ～905

※ PRINT JOB IS AUTOMATICALLY DISCARDED
　IF NO ACCESS IS MADE FOR 10 MINUTES

DOMAIN NAME REGISTRATION

DOMAIN NAME AS PRINT TARGET — 1703 ganon : ☑ ganongroup : ☑

_____ : ☐

ADD    DELETE 1702   1701

IMAGE FORMING APPARATUS, IMAGE FORMING SYSTEM AND CONTROL METHODS THEREOF

BACKGROUND OF THE INVENTION

1. Field of the Invention

The present invention relates to an image forming apparatus which prevents unauthorized printing, an image forming system, and control methods thereof.

2. Description of the Related Art

Existing image forming apparatuses can perform printing from a client PC via a network. Image forming apparatuses have until the recently only been used within the confines of an office, but since they are now connected to the Internet, it is now possible to print from outside the office. This has brought about a new usage method whereby an image forming apparatus is used in place of a FAX apparatus, thus improving convenience.

However, since anyone can perform printing via the Internet, a problem arises whereby such anonymity is misused through unauthorized printing. More specifically, for example, mass printing of, for example, advertisement data is a known problem. Especially, in recent years, an attack method called cross-site scripting (XSS) has become known. In XSS, an unauthorized script is embedded in a web server using a PUT method of an HTTP server; then, client PCs that refer to that site are used to execute unauthorized printing. As a result, resources such as print sheets and toner are wasted by such unauthorized printing which poses a problem for the administrators and legitimate users of such image forming apparatuses with respect to printing normal print jobs.

Conventionally, in order to prevent such unauthorized printing, it is a common practice to provide an authentication mechanism that specifies a user who transmitted a job, and permits only a legitimate user to perform printing. For example, IPP (Internet Printing Protocol), defined by RFC 2911, will be exemplified below. IPP uses HTTP (HyperText Transfer Protocol), defined by RFC 2616 as its transport layer. For this reason, a user who performed printing can be authenticated by, for example, BASIC authentication/Digest authentication included in the HTTP protocol itself. As another method, a dedicated printer driver is used so that print data itself includes authentication information, and an image forming apparatus extracts authentication information included in data and performs authentication upon analysis of the print data.

Japanese Patent Laid-Open No. 2004-164233 proposed a technique that temporarily stores received print data in a storage device, and actually prints only print data corresponding to a printer model, so as to prevent unwanted printing. According to the technique described in Japanese Patent Laid-Open No. 2004-164233, even when unauthorized print data is sent to the printer, if model information included in the print data does not match, that print data is deleted without being printed, thus suppressing wasteful printing.

However, the aforementioned related arts suffers problems to be described below. For example, in the authentication method of the related art, authentication information such as a user name and password required to perform authentication has to be set in advance in the image forming apparatus. For this reason, an administrator is required to perform troublesome operations such as maintenance of authentication information, and synchronization of items of authentication information in respective apparatuses when there are a plurality of image forming apparatuses.

Also, the technique described in Japanese Patent Laid-Open No. 2004-164233 allows control that prohibits printing until the user selects stored print data and inputs a print instruction when the size of print data exceeds a prescribed value. However, when a legitimate user executes printing that exceeds the prescribed value of the size, and print processing is not executed in practice, the user notices it only when he or she moves to a position in front of the image forming apparatus. Therefore, in an urgent case, the user has to issue a new print instruction there, and wait for completion of printing, resulting in inconvenience.

SUMMARY OF THE INVENTION

The present invention enables realization of an image forming apparatus which prevents unauthorized printing without impairing user convenience, an image forming system, and control methods thereof. One aspect of the present invention provides an image forming apparatus, which is connected to a firewall that restricts accesses from an external network via a network, and comprises a Web server, comprising: a storage unit that temporarily stores a print job which is received from an external apparatus connected via the network in a memory of the image forming apparatus; a creation unit that creates a URL which is uniquely assigned to the print job and is required to access the Web server; a detection unit that detects an access to the created URL; and an execution unit that controls a printing unit of the image forming apparatus to print the temporarily stored print job under a condition that the access to the URL is detected.

Another aspect of the present invention provides an image forming system in which an image forming apparatus comprising a Web server, an information processing apparatus, and a firewall are connected via a network, the information processing apparatus comprising a unit that requests a print job to the image forming apparatus, and a unit that accesses information of a URL transmitted from the image forming apparatus; the image forming apparatus comprising a storage unit that temporarily stores the print job received from the information processing apparatus in a memory of the image forming apparatus, a creation unit that creates a URL which is uniquely assigned to the print job and is required to access the Web server, a transmission unit that transmits information including the created URL to the information processing apparatus, a detection unit that detects an access to the transmitted URL, and an execution unit that controls a printing unit of the image forming apparatus to print the temporarily stored print job under a condition that the access to the URL is detected; and the firewall comprising a prohibition unit that prohibits an access to the URL from an external network connected to the network.

Still another aspect of the present invention provides a method of controlling an image forming apparatus, which is connected to a firewall that restricts accesses from an external network via a network, and comprises a Web server, comprising: temporarily storing a print job which is received from an external apparatus connected via the network in a memory of the image forming apparatus; creating a URL which is uniquely assigned to the print job and is required to access the Web server; detecting an access to the created URL; and controlling a printing unit of the image forming apparatus to print the temporarily stored print job under a condition that the access to the URL is detected.

Yet still another aspect of the present invention provides a method of controlling an image forming system in which an image forming apparatus comprising a Web server, an information processing apparatus, and a firewall are connected via a network, the information processing apparatus comprising: requesting a print job to the image forming apparatus, and accessing information of a URL transmitted from the image forming apparatus; the image forming apparatus comprising: temporarily storing the print job received from the information processing apparatus in a memory of the image forming apparatus, creating a URL which is uniquely assigned to the print job and is required to access the Web server, transmitting information including the created URL to the information processing apparatus, detecting an access to the transmitted URL, and controlling a printing unit of the image forming apparatus to print the temporarily stored print job under a condition that the access to the URL is detected; and the firewall comprising: prohibiting an access to the URL from an external network connected to the network.

Still yet another aspect of the present invention provides an image forming apparatus, which is connected to a firewall that restricts accesses from an external network via a network, and comprises a Web server, comprising: a determination unit that determines whether or not a print job received from an external apparatus connected via the network is temporarily stored in a memory of the image forming apparatus; a storage unit that temporarily stores the print job in the memory when the determination unit determines that the received print job is stored in the memory of the image forming apparatus; a discard unit that discards the print job when the determination unit determines that the received print job is not stored in the memory of the image forming apparatus; a creation unit that creates URLs which are uniquely assigned to the print job, are required to access the Web server, and include a first URL required to execute the print job, and a second URL required to discard the print job; a detection unit that detects an access to the created first URL and the second URL; and an execution unit that discards the temporarily stored print job under a condition that an access to the second URL is detected, and controls a printing unit of the image forming apparatus to print the temporarily stored print job under a condition that an access to the first URL is detected.

Yet still another aspect of the present invention provides a method of controlling an image forming apparatus, which is connected to a firewall that restricts accesses from an external network via a network, and comprises a Web server, comprising: determining whether or not a print job received from an external apparatus connected via the network is temporarily stored in a memory of the image forming apparatus; temporarily storing the print job in the memory when it is determined in the determining that the received print job is stored in the memory of the image forming apparatus; discarding the print job when it is determined in the determining that the received print job is not stored in the memory of the image forming apparatus; creating URLs which are uniquely assigned to the print job, are required to access the Web server, and include a first URL required to execute the print job, and a second URL required to discard the print job; detecting an access to the created first URL and the second URL; and discarding the temporarily stored print job under a condition that an access to the second URL is detected, and controlling a printing unit of the image forming apparatus to print the temporarily stored print job under a condition that an access to the first URL is detected.

Further features of the present invention will be apparent from the following description of exemplary embodiments with reference to the attached drawings.

BRIEF DESCRIPTION OF THE DRAWINGS

FIG. 6 is a view showing an example of a setting screen 600 displayed on a display unit of a client PC 201 according to the first embodiment;

FIG. 9 is a view showing an example of an e-mail message 900 according to the first embodiment;

FIG. 10 shows an example of a management table 1000 which associates URLs created by the image forming apparatus 100 and print jobs according to the first embodiment;

FIG. 16 is a view showing an example of an e-mail message 1600 according to the second embodiment; and FIG. 17 is a view showing an example of a domain name registration screen 1700 according to the second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Hardware Arrangement of Image Forming Apparatus>

Figure 1:
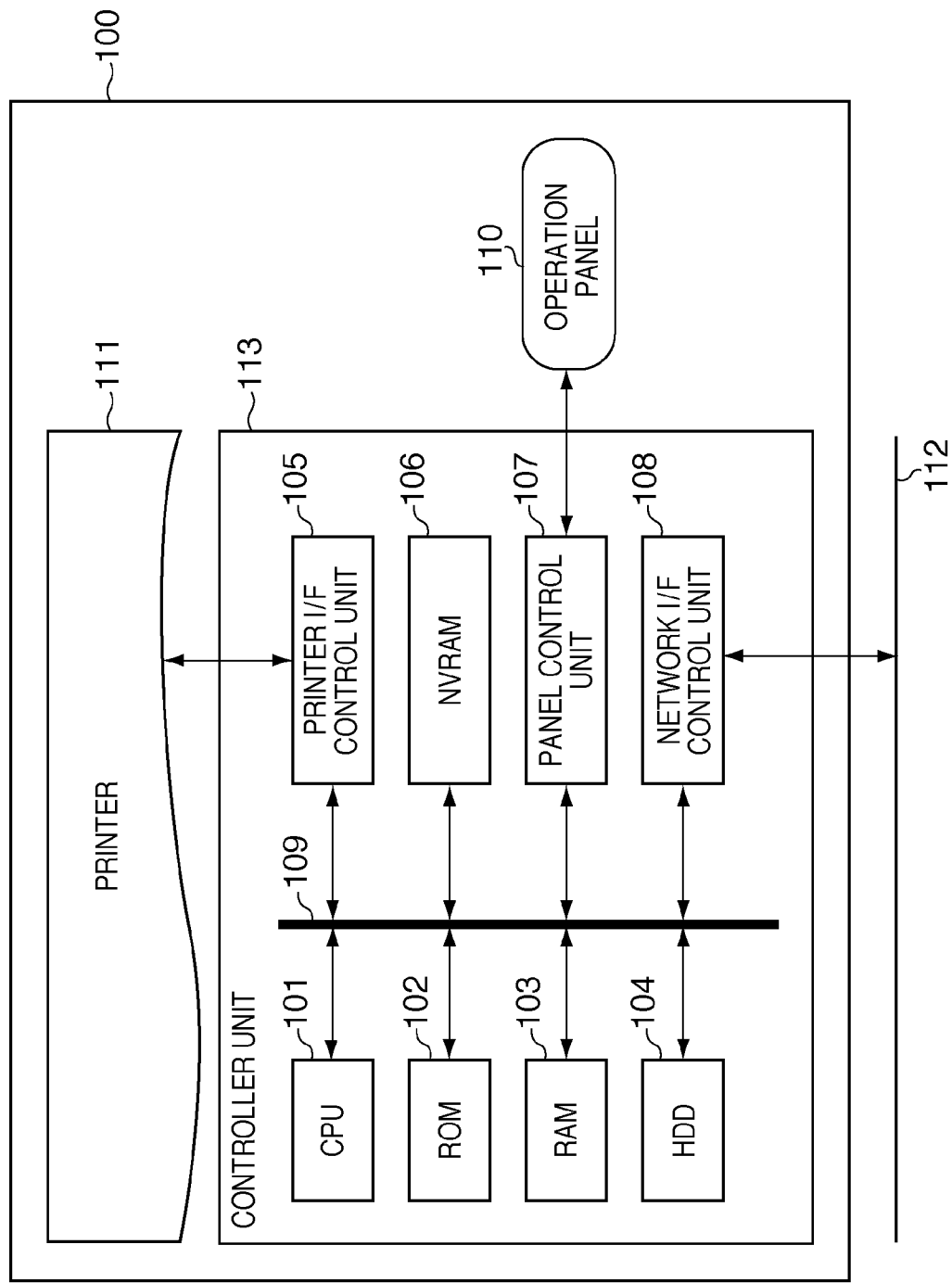
FIG. 1 is a block diagram showing an example of the hardware arrangement of an image forming apparatus 100 according to the first embodiment.

FIG. 1 is a block diagram showing an example of the hardware arrangement of an image forming apparatus 100 according to this embodiment. The image forming apparatus 100 includes a printer 111, controller unit 113, and operation panel 110. The printer 111 forms an image on, for example, a printing material in accordance with image data output from the controller unit 113. The controller unit 113 systematically controls the image forming apparatus 100, and includes a CPU 101, ROM 102, RAM 103, HDD 104, printer I/F control unit 105, NVRAM 106, panel control unit 107, and network I/F control unit 108. Respective components are connected via a bus 109. The network I/F control unit 108 is connected to a LAN (Local Area Network) 112. The operation panel 110 serves as a user interface, and includes a display unit of a touch panel type and an operation unit including hardware keys.

The CPU 101 controls the overall apparatus by executing software programs of the image forming apparatus 100. The ROM 102 is a read-only memory, and stores a boot program, fixed parameters, and the like of the apparatus. The RAM 103 is a random-access memory, and is used to temporarily store data when the CPU 101 controls the apparatus. The HDD 104 is a hard disk drive, and is used to store various data such as print data. The printer I/F control unit 105 is a device which controls the printer 111. The NVRAM 106 is a nonvolatile memory, and is used to save various setting values of the image forming apparatus. The panel control unit 107 controls the operation panel 110, displays various kinds of information, and accepts an instruction input from the user. The network I/F control unit 108 controls data exchange with the LAN 112. The bus 109 is a system bus used to exchange control signals from the CPU 101 and data signals among the respective units.

<Arrangement of Image Forming System>

Figure 2:
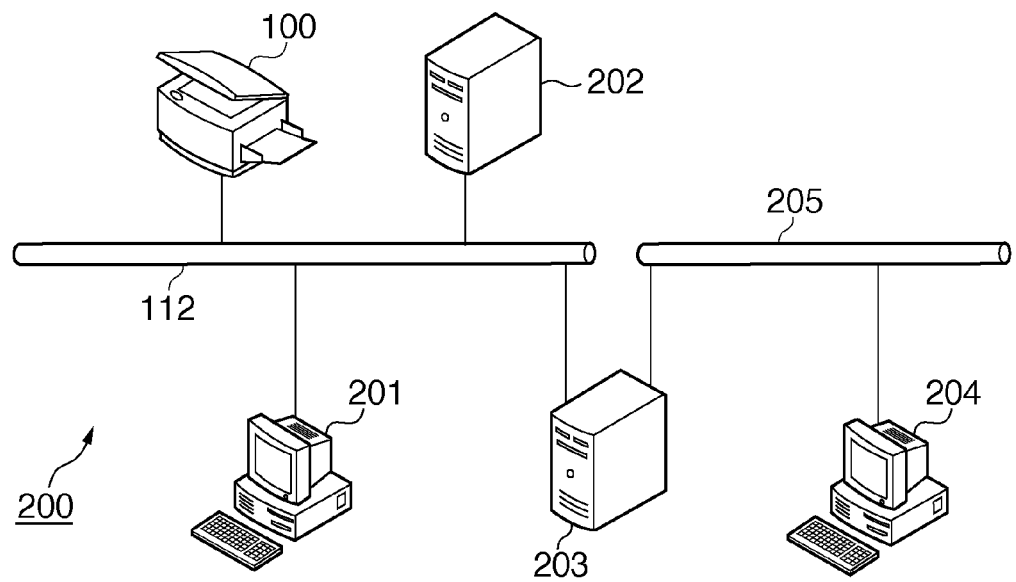
FIG. 2 is a diagram showing an example of the arrangement of an image forming system 200 according to the first embodiment.

An image forming system 200 according to this embodiment will be described below with reference to FIG. 2. The image forming system 200 includes the image forming apparatus 100, a client PC 201 serving as an information processing apparatus, a mail server 202, and a firewall server 203. The image forming system 200 is connected to an external network 205 via the firewall server 203, and is connected to a PC 204 via the external network 205. The image forming apparatus 100, mail server 202, and client PC 201 are connected to the LAN 112, and can communicate with each other. The client PC 201 is connected as an external apparatus of the image forming apparatus 100 via the LAN 112. For example, the client PC 201 sends a print job request to the image forming apparatus 100. The firewall server 203 connects the LAN 112 and the external network 205 such as the Internet. The PC 204, which exists on the external network and is used by a malicious user, is connected to the external network 205. The firewall server 203 relays only required packets which are set in advance between the LAN 112 and external network 205. Then, the firewall server 203 can prohibit accesses from the external network 205 to created URLs (to be described later).

<Software Configuration of Image Forming Apparatus>

Figure 3:
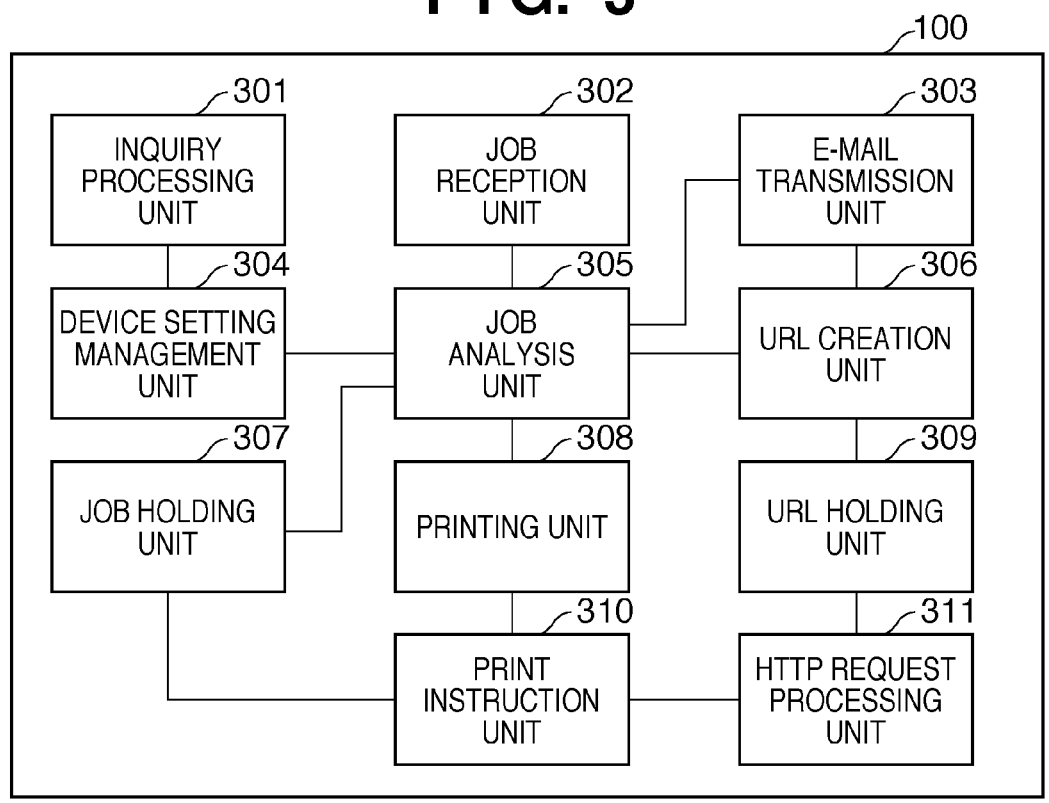
FIG. 3 is a block diagram showing the software configuration of the image forming apparatus 100 according to the first embodiment.

FIG. 3 is a block diagram showing the software configuration of the image forming apparatus 100 according to this embodiment. The image forming apparatus 100 includes, as the software configuration, an inquiry processing unit 301, job reception unit 302, e-mail transmission unit 303, device setting management unit 304, job analysis unit 305, URL creation unit 306, job holding unit 307, printing unit 308, URL holding unit 309, print instruction unit 310, and HTTP request processing unit 311.

Upon reception of an inquiry about storage target job settings from the client PC 201, the inquiry processing unit 301 acquires setting information from the device setting management unit 304, and notifies the client PC 201 of the acquired setting information. The device setting management unit 304 manages device setting information such as storage target jobs. The job reception unit 302 receives a job from, for example, the client PC 201. The job analysis unit 305 compares the received job type and the setting information set in the device setting management unit 304 to determine if the received job is a printable job or storage job. If the received job is a printable job, the printing unit 308 performs printing of that job. On the other hand, if the received job is a storage job, the job holding unit 307 holds that job, and the URL creation unit 306 creates a unique URL. This URL is used to access a Web server included in the image forming apparatus 100. The e-mail transmission unit 303 transmits the URL created by the URL creation unit 306 using an e-mail message to an e-mail address extracted by the job analysis unit 305. The URL holding unit 309 holds the created URL information in association with the job. The HTTP request processing unit 311 corresponds to an internal Web server. The HTTP request processing unit 311 receives an HTTP request from the client PC 201. When the URL of the request matches that held in the URL holding unit 309, the HTTP request processing unit 311 issues a print instruction command to the print instruction unit 310. The print instruction unit 310 searches the job holding unit 307 for a job associated with the transmitted URL information, and the printing unit 308 prints the found job.

<Control of Print Job>

Figure 4:
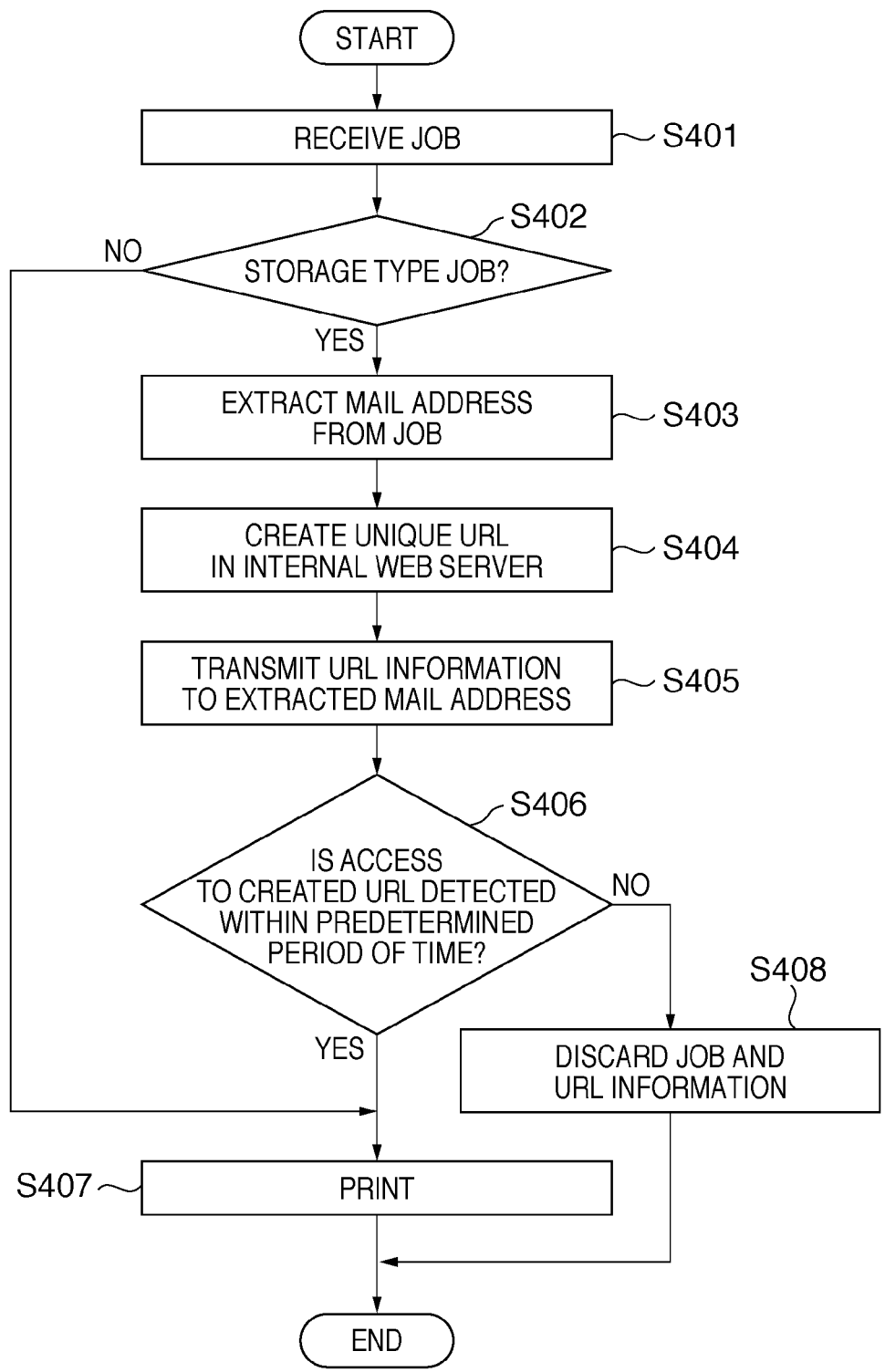
FIG. 4 is a flowchart showing the processing sequence upon processing a print job according to the first embodiment.

Print job processing in the image forming apparatus 100 will be described below with reference to FIG. 4. The processing to be described below is systematically controlled when the CPU 101 reads out and executes control programs stored in the ROM 102.

In step S401, the job reception unit 302 receives a print job from an external PC (e.g., the client PC 201) connected via the LAN 112. Upon reception of the print job, the job analysis unit 305 analyzes the print job to determine in step S402 if that job is a storage target job. If the received job is not a storage target job, the process advances to step S407, and the printing unit 308 prints the received job.

On the other hand, if the received job is a storage target job, the process advances to step S403, and the job analysis unit 305 extracts a mail address from the job. In step S404, the URL creation unit 306 creates a unique URL associated with the received job. This URL is used to access the Web server included in the image forming apparatus 100. Furthermore, in step S405 the e-mail transmission unit 303 transmits the created URL information to the extracted mail address.

After that, in step S406 the CPU 101 monitors an access to the created URL until a predetermined period of time elapses. In this step, the CPU 101 times an elapsed time period using, for example, a timer included in the controller unit 113. If no access is made to the created URL before an elapse of the predetermined period of time, the process advances to step S408, and the CPU 101 discards the received job held in the job holding unit 307 and the URL information held in the URL holding unit 309. On the other hand, if an access to the created URL is detected before an elapse of the predetermined period of time, the process advances to step S407, and the printing unit 308 prints the received job under the condition that the access to the URL is detected.

A case will be examined below wherein the PC 204, which is connected to the external network 205 and is operated by a malicious attacker, notifies the client PC 201 of a print job execution instruction by a method such as XSS. In this case, the client PC 201 executes printing without being recognized by the user of the client PC 201.

Even when the e-mail transmission unit 303 transmits an e-mail message appended with URL information to the attacker in step S405, the firewall server 203 normally does not relay any HTTP request from the external network 205 to the LAN 112. Therefore, since no access to the created URL is generated before an elapse of the predetermined period of time in step S406, the job held in the job holding unit 307 and the URL information held in the URL holding unit 309 are discarded in step S408.

In case of an environment in which the firewall server 203 relays an HTTP request from the external network 205 to the LAN 112 or that which does not include the firewall server 203 itself, the same effect as the firewall server can be obtained using an IP filter function. In this case, the IP filter setting of the image forming apparatus 100 is set to permit only accesses from a network in the LAN. Then, even when the attacker transmits an HTTP request from the external network 205 to the LAN 112, that request is discarded.

<Setting Screen>

Figure 5:
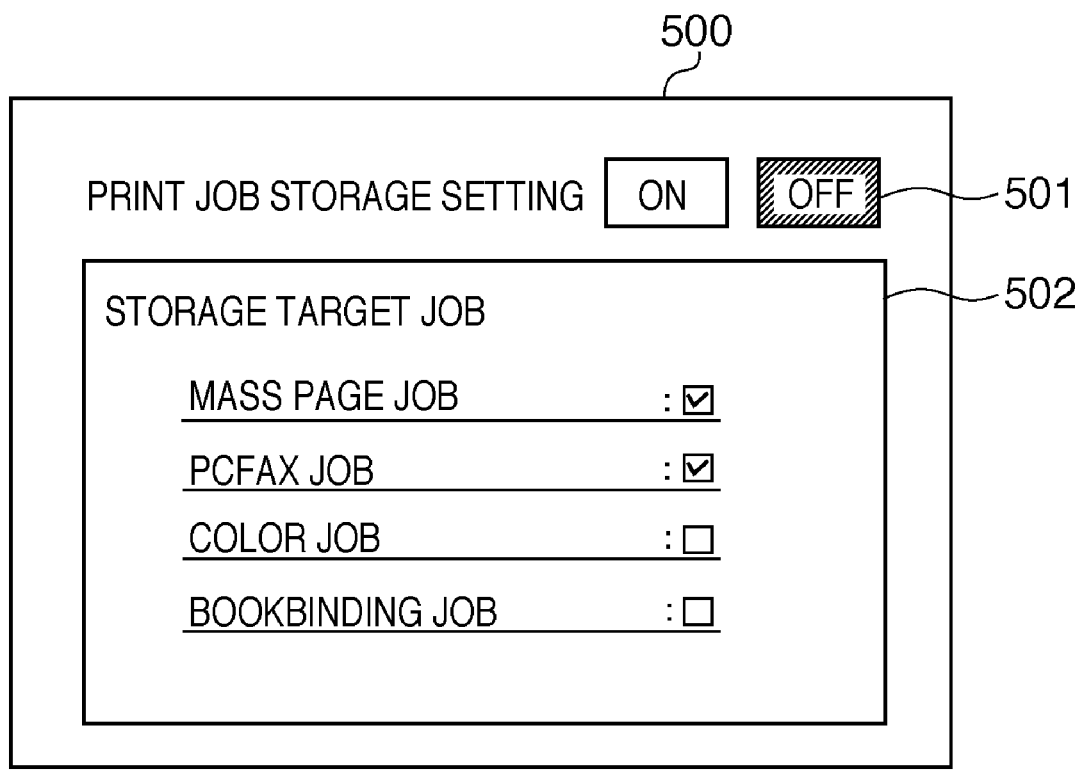
FIG. 5 is a view showing an example of a setting screen 500 used to store a print job according to the first embodiment.

Examples of respective setting screens will be explained below with reference to FIGS. 5 and 6. FIG. 5 shows an example of a setting screen 500 used to store a print job according to this embodiment.

The setting screen 500 includes setting buttons 501 used to set to enable/disable a storage setting of a print job, and a selection area 502 used to select a job type as a storage target, and is displayed on the display unit of the operation panel 110. The setting buttons 501 allow the user to set whether or not a print job is handled as a storage job when he or she selects and presses the ON or OFF button. The job types displayed on the selection area 502 include, for example, a mass page job, PCFAX job, color job, and bookbinding job, as shown in FIG. 5. The mass page job is a job having the number of pages larger than the predetermined number of pages. The PCFAX job is a transfer job, which controls the image forming apparatus 100 to FAX-transmit the received print job. The color job is a color print job. The bookbinding job is a print job that designates bookbinding processing such as staple processing and case binding processing after printing. The user can set an arbitrary job as a storage target job. In this manner, the image forming apparatus 100 sets job types as storage targets based on user inputs which are input via the setting screen 500.

Figure 6:
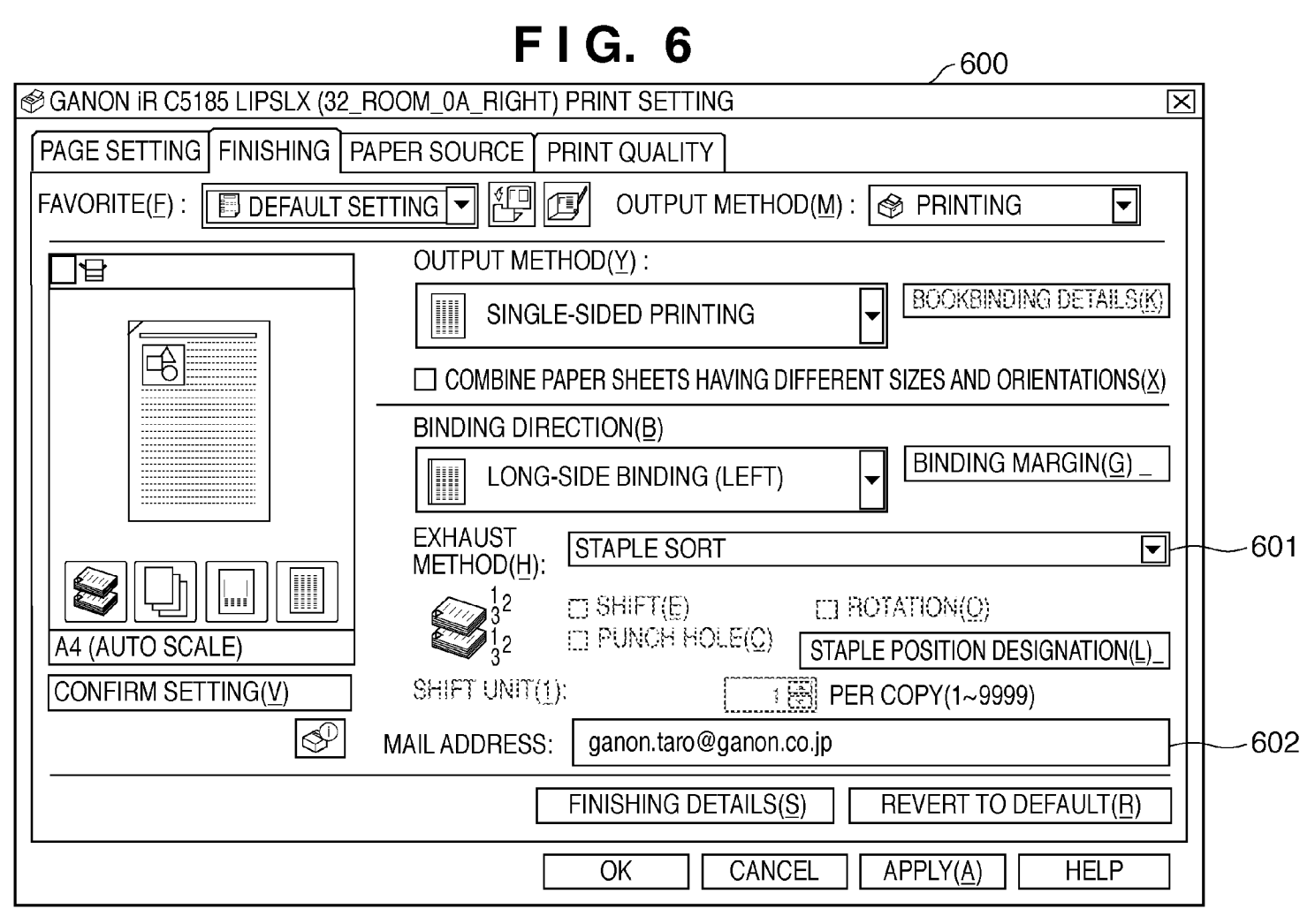

FIG. 6 shows an example of a setting screen 600 displayed on the display unit of the client PC 201 according to this embodiment. The setting screen 600 is displayed on the display unit of the client PC 201 when the client PC 201 issues a print job request to the image forming apparatus 100.

An exhaust method 601 is a setting used to designate processing at the time of exhausting paper sheets, and allows to make a staple setting. A mail address 602 is used to set a mail address to which the image forming apparatus 100 notifies unique URL information required to execute printing when a print job is determined as a storage job. When a bookbinding job is designated as a storage target job on the setting screen 500, if the staple setting is made in the exhaust method 601, it is indispensable to input the mail address 602 upon execution of the print job.

<Transmission Packet>

Figure 7:
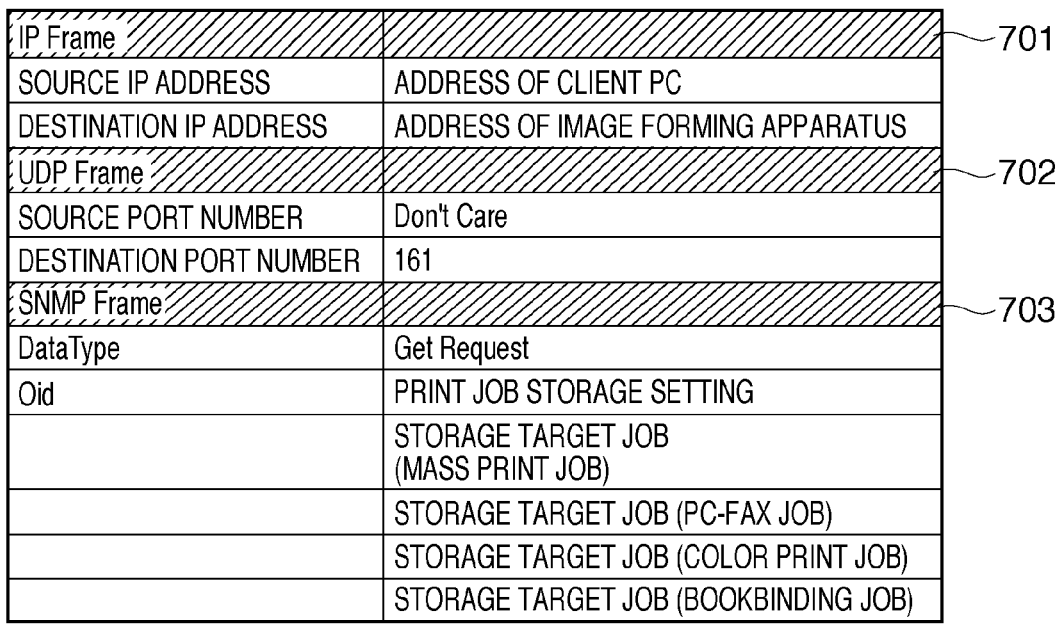
FIG. 7 is a view showing an example of an SNMP request packet 700 according to the first embodiment.

The configurations of packets exchanged between the image forming apparatus 100 and an external apparatus (for example, the client PC 201) will be described below with reference to FIGS. 7 and 8. FIG. 7 shows an example of an SNMP request packet 700 transmitted when the client PC 201 according to this embodiment acquires print job storage settings of the image forming apparatus 100.

The SNMP request packet 700 includes an IP Frame 701, UDP Frame 702, and SNMP Frame 703. In the IP Frame 701, the address of the client PC is set in a source IP address field, and the IP address of the image forming apparatus 100 is set in a destination IP address field. In the UDP Frame 702, an arbitrary port number designated by the client PC is set in a source port number field, and an SNMP port number "161" is set in a destination port number field. In the SNMP Frame 703, "GetRequest" is set in a DataType field, and a print job storage setting, and storage target job settings (mass printing, PCFAX, color printing, and bookbinding) of the device are set in fields of Oid information to be requested.

Figure 8:
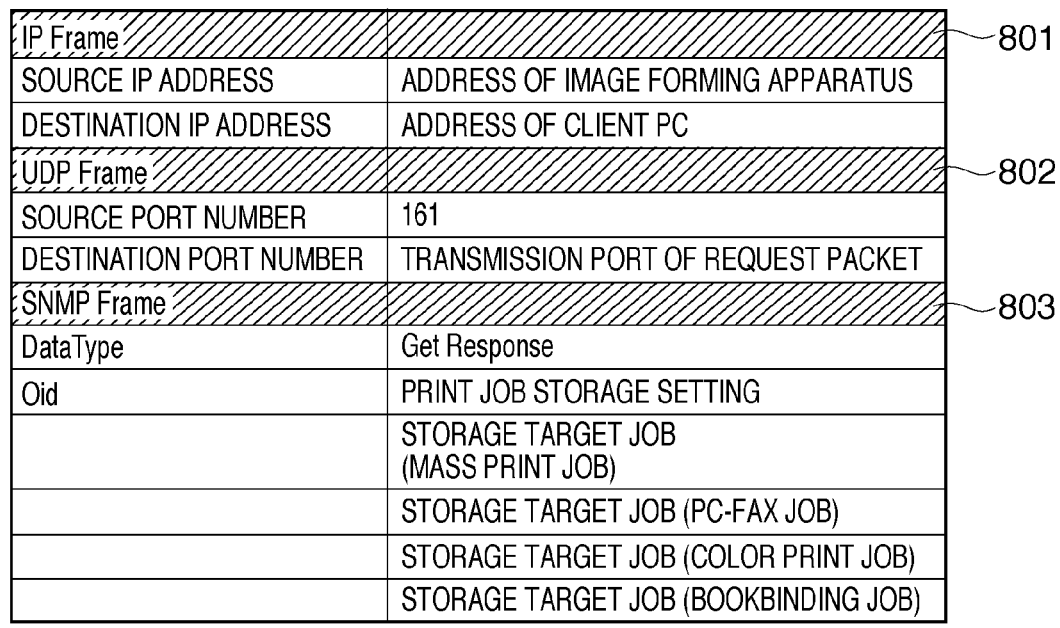
FIG. 8 is a view showing an example of an SNMP response packet 800 according to the first embodiment.

FIG. 8 shows an example of an SNMP response packet 800 which is transmitted from the image forming apparatus to the client PC according to this embodiment. The SNMP response packet 800 is transmitted as a response to the SNMP request packet 700.

The SNMP response packet 800 includes an IP Frame 801, UDP Frame 802, and SNMP Frame 803. In the IP Frame 801, the IP address of the image forming apparatus 100 is set in a source IP address field, and the address of the client PC is set in a destination IP address field. In the UDP Frame 802, an SNMP port number "161" is set in a source port number field, and an arbitrary port number designated by the client PC is set in a destination port number field. In the SNMP Frame 803, "GetResponse" is set in a DataType field, and setting values of a print job storage setting, and storage target job settings (mass printing, PC-FAX, color printing, and bookbinding) of the device are set in fields of Oid information to be returned.

<E-Mail>

An e-mail message transmitted in step S405 in FIG. 4 will be described below with reference to FIG. 9. FIG. 9 shows an example of an e-mail message 900 transmitted by the image forming apparatus 100 so as to notify the created URL according to this embodiment.

The e-mail message 900 includes following pieces of information 901 to 904. The information 901 indicates a receiving printer name. The information 902 indicates a job name analyzed by the job analysis unit 305. The information 903 indicates a user name of a received job analyzed by the job analysis unit 305. The information 904 indicates unique URL information which is created by the URL creation unit 306 and is associated with the received job. The user can execute the print job by clicking the URL 904 of the received e-mail message 900 by using, for example, a mouse.

<Management Table>

A management table which associates URLs and print jobs with each other will be described below with reference to FIG. 10. FIG. 10 shows an example of a management table 1000 which associates URLs created by the image forming apparatus 100 according to this embodiment, and print jobs with each other.

The management table 1000 is defined to include a job ID 1001, job name 1002, user name 1003, and URL character string 1004. The job ID 1001 is an ID that is internally assigned to a received job by the image forming apparatus 100. The job name 1002 is that of a received job analyzed by the job analysis unit 305. The user name 1003 is that of the received job analyzed by the job analysis unit 305. The URL character string 1004 is a unique character string designated in a URL. The image forming apparatus 100 adds information to the management table 1000 every time it receives a storage target job. On the other hand, after printing is executed, the image forming apparatus 100 deletes information of the corresponding job from the management table 1000.

As described above, the image forming apparatus according to this embodiment is connected to the firewall server, which restricts accesses from the external network, via the LAN, and receives a print job from an external apparatus (for example, the client PC). Upon reception of the print job, the image forming apparatus determines whether or not the print job is a storage target job. When the print job is a storage target job, the image forming apparatus temporarily stores the print job in a memory without starting printing. Then, the image forming apparatus creates and transmits a URL, which is uniquely assigned to the print job and is required to access the Web server included in the self apparatus, to the external apparatus which transmitted the print job. After that, the image forming apparatus monitors an access to that URL.

When an access is generated, the image forming apparatus starts printing of the temporarily stored print job. Note that an access from a PC connected to the external network other than the LAN of those to this URL is restricted by the firewall server. Therefore, since the image forming apparatus prints only a print job corresponding to the confirmed access to the URL, a print job from the PC connected to the external network can be restricted. Hence, a malicious print job from the PC connected to the external network can be prevented. Note that since a print job can be restricted in this way, the need for authentication processing for each user can be obviated, resulting in improvement of user's operability.

Note that the present invention is not limited to the aforementioned embodiment and allows various modifications. For example, the image forming apparatus discards image data of the temporarily held print job and information of the URL after an elapse of the predetermined period of time since the URL is transmitted to the PC that transmitted the print job. Then, the image forming apparatus can efficiently practice the security function using accesses to URLs without wasting memory resources.

The image forming apparatus can arbitrarily set storage target job types, and may determine storage target jobs based on that setting information. As a result, the image forming apparatus can change storage target jobs according to the use conditions of the image forming system realized via the LAN, thus achieving flexible security.

When the image forming system does not include any firewall server or when the firewall server does not have any function of restricting HTTP accesses, the image forming apparatus may accept only accesses from IP addresses which are set in advance. Then, the image forming apparatus can attain the aforementioned security function using accesses to URLs independently of its location and environment.

<Second Embodiment>

The second embodiment will be described below with reference to FIGS. 11 to 17. In the first embodiment, a confirmation mail message that describes a unique URL created by the internal server of the image forming apparatus is transmitted to a mail address described in a print job so as to confirm whether or not to execute the print job. Then, when that URL is accessed, the print job is executed. However, the job holding unit of the image forming apparatus has to manage the job for a predetermined period of time until the user's access is detected. When the print job is not a legitimate job, basically no access may be made to the URL. Hence, when a plurality of such jobs are received, the HDD in the image forming apparatus may become full. When the HDD is full, applications such as secure print and box print which use the HDD can no longer be used.

Hence, in this embodiment, when print data as a storage target, which is set in advance, is received, whether or not a received print job is an unauthorized job is determined by seeing if the domain of a mail address appended to the print job is registered, before that job is stored. Since an unauthorized print job need not be stored in the image forming apparatus, if the print job is an unauthorized job, that job is discarded at this timing. Then, when a plurality of unauthorized jobs are received, the HDD in the image forming apparatus can be prevented from being tightened. Since simple user authentication is made based on the domain of the mail address, an administrator need not set authentication information for each user in the image forming apparatus, thus preventing unauthorized printing.

In the second embodiment, print data is stored, and two URLs, that is, a URL required to execute the stored print job and that of an internal HTTP server to be accessed to delete the print data are generated. The user can freely select to execute or delete a print job since he or she accesses one of the URLs notified from a driver using an HTTP client such as a WEB browser. Therefore, when a print job that the user does not know is stored in the image forming apparatus, the user who receives that notification can promptly delete the print job. Then, even when an unauthorized print job is stored in the image forming apparatus, it can be deleted at an earlier timing than the related art, thus reducing use of extra resources of the HDD in the image forming apparatus as much as possible.

<Software Configuration>

Figure 11:
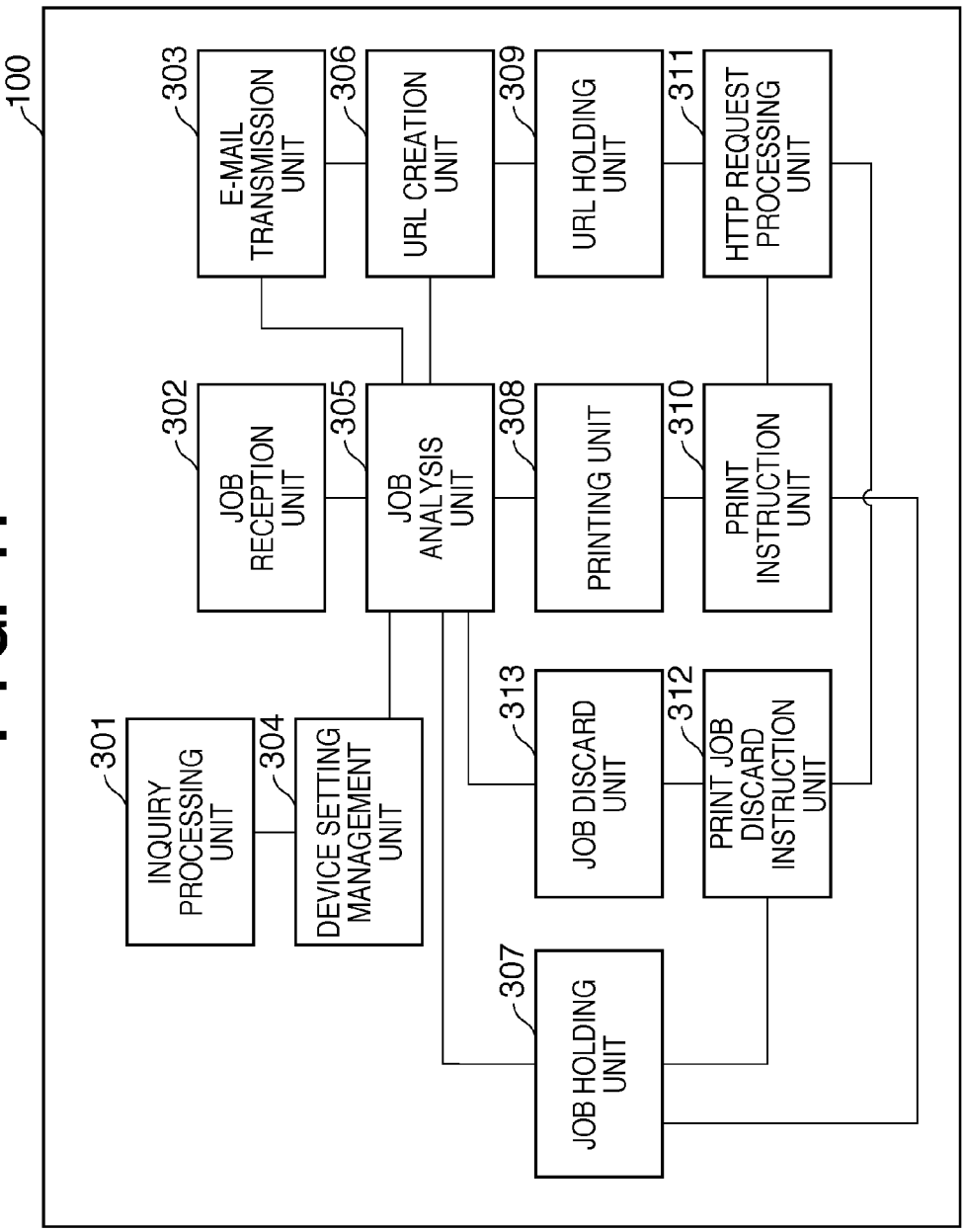
FIG. 11 is a block diagram showing the software configuration of an image forming apparatus 100 according to the second embodiment.

An example of the software configuration of an image forming apparatus 100 will be described first with reference to FIG. 11. When an inquiry processing unit 301 receives an inquiry about storage target job settings from a client PC 201, it sends an inquiry to a device setting management unit 304, and returns device setting information. The device setting management unit 304 manages device settings such as storage target job settings. A job reception unit 302 receives a job from the client. A job analysis unit 305 compares a received job type and the storage target job settings set in the device setting management unit 304 to determine first if the received job is a printable job or storage job. If the received job is a printable job, a printing unit 308 prints that job. If the received job is a storage job, the job analysis unit 305 compares a domain name of a mail address extracted by itself and that registered in the device setting management unit 304. If the extracted domain name does not match the registered domain name, the job analysis unit 305 determines that the received job is an unauthorized job, and a job discard unit 313 discards that job. On the other hand, if the extracted domain name matches the registered domain name, a job holding unit 307 holds job information, and a URL creation unit 306 creates two URLs associated with the job. An e-mail transmission unit 303 transmits, using an e-mail message, the two URLs created by the URL creation unit 306 to the e-mail address extracted by the job analysis unit 305. A URL holding unit 309 holds the two pieces of generated URL information in association with the job. An HTTP request processing unit 311 receives an HTTP request from a print client. When the URL of the HTTP request matches that held by the URL holding unit 309, the HTTP request processing unit 311 executes processing corresponding to that request.

In this embodiment, there are two types of processing, that is, processing for issuing a print instruction command to a print instruction unit 310, and that for issuing a job discard instruction command to a job discard instruction unit 312. The print instruction unit 310 searches the job holding unit 307 for a job associated with the transmitted URL information, and the printing unit 308 prints the found job. The job discard unit 313 searches jobs held in the job holding unit 307 for a job associated with the transmitted URL information as in the print instruction command. If a job is found, the job discard unit 313 deletes the job information from the job holding unit 307, and also the URL information held in the URL holding unit 309.

<Control of Print Job>

Figure 12:
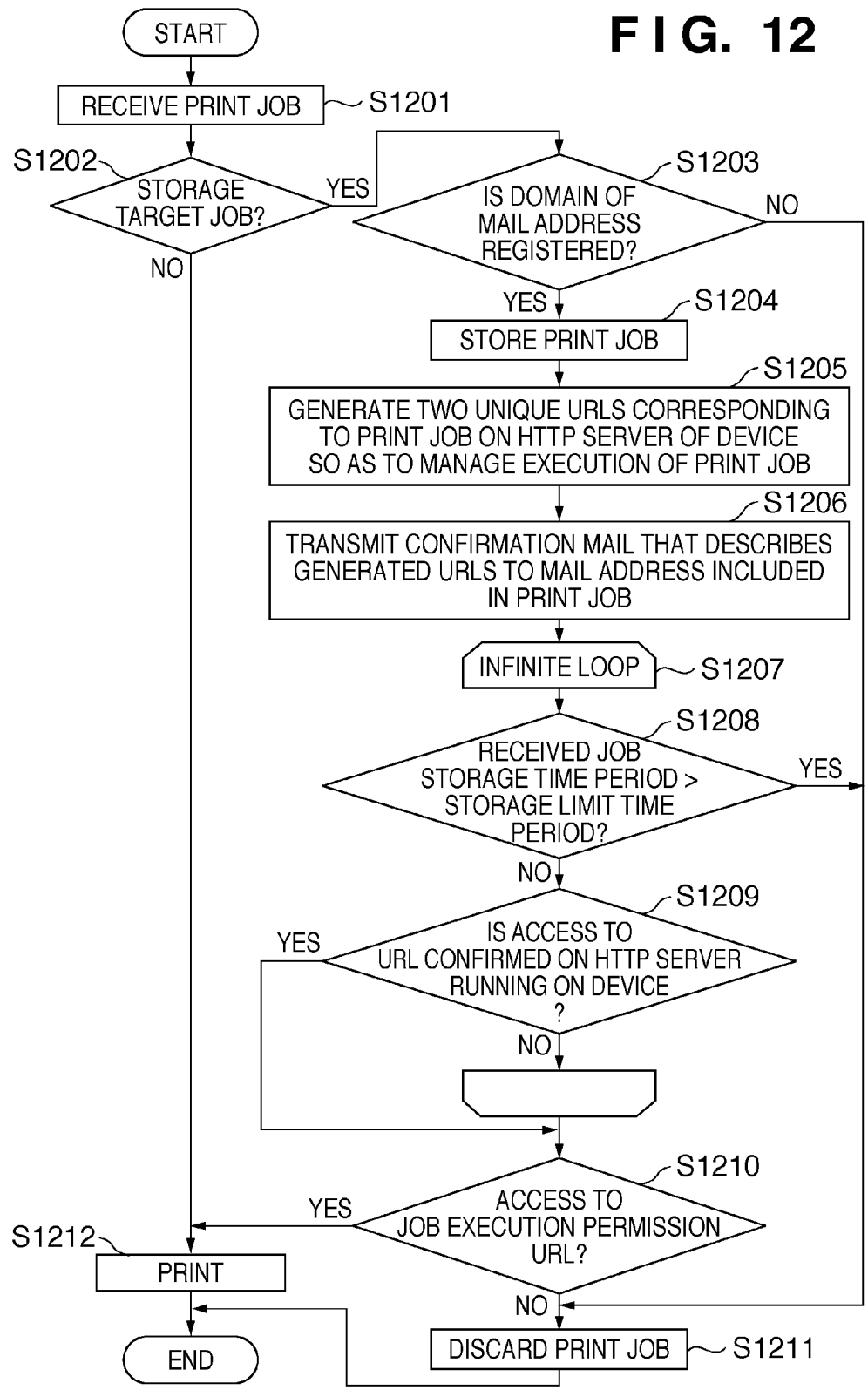
FIG. 12 is a flowchart showing the processing sequence upon processing a print job according to the second embodiment.

Print job processing in the image forming apparatus 100 will be described below with reference to FIG. 12. The processing to be described below is systematically controlled when a CPU 101 reads out and executes control programs stored in a ROM 102.

In step S1201, the job reception unit 302 receives a print job from an external PC connected via a LAN 112. Upon reception of the print job, the job analysis unit 305 analyzes the print job to determine in step S1202 if that job is a storage target job. If the print job is not a storage target job, the process advances to step S1212, and the printing unit 308 prints the received job.

On the other hand, if the received job is a storage target job, the process advances to step S1203. In step S1203, the job analysis unit 305 extracts a mail address from the job, and compares its domain name with the registered domain name. If the extracted domain name does not match the registered domain name, the job analysis unit 305 determines that the received job is an unauthorized job, and the process advances to step S1211. In step S1211, the job discard unit 313 discards the job. Thus, this embodiment suppresses the memory from being wasted due to storage of an unauthorizedly requested print job in the memory. If the two domain names match, the process advances to step S1204, and the job holding unit 307 temporarily stores the print job. Then, in step S1205 the URL creation unit 306 creates two unique URLs, that is, those for print execution permission and for deletion, which are associated with the received job.

In step S1206, the e-mail transmission unit 303 transmits the pieces of generated URL information to the extracted mail address. Subsequently, an access to one of the URLs generated in step S1206 is monitored within a loop in step S1207, that is, within a received job storage limit time period. More specifically, the CPU 101 compares a received job storage time period and the received job storage limit time period in step S1208. When the received job storage time period exceeds the storage limit time period, the process advances to step S1211, and the job discard unit 313 discards the received job held in the job holding unit 307 and the URL information held in the URL holding unit 309.

On the other hand, if the storage time period falls within the limit time period, the process advances to step S1209, and the CPU 101 determines if an access to one of the generated URLs is detected. If no access is detected, the process returns to step S1208 to continue to monitor an access to the URL. On the other hand, if an access is detected, the control exits the loop in step S1207, and the process advances to step S1210. In step S1210, the CPU 101 determines whether or not the URL for print execution permission is accessed. If the URL for print execution permission is accessed, the printing unit 308 prints the received job in step S1212. On the other hand, if the URL for deletion is accessed, the job discard unit 313 discards the received job held in the job holding unit 307 and the URL information held in the URL holding unit 309 in step S1211.

<Setting Screen>

Figure 13:
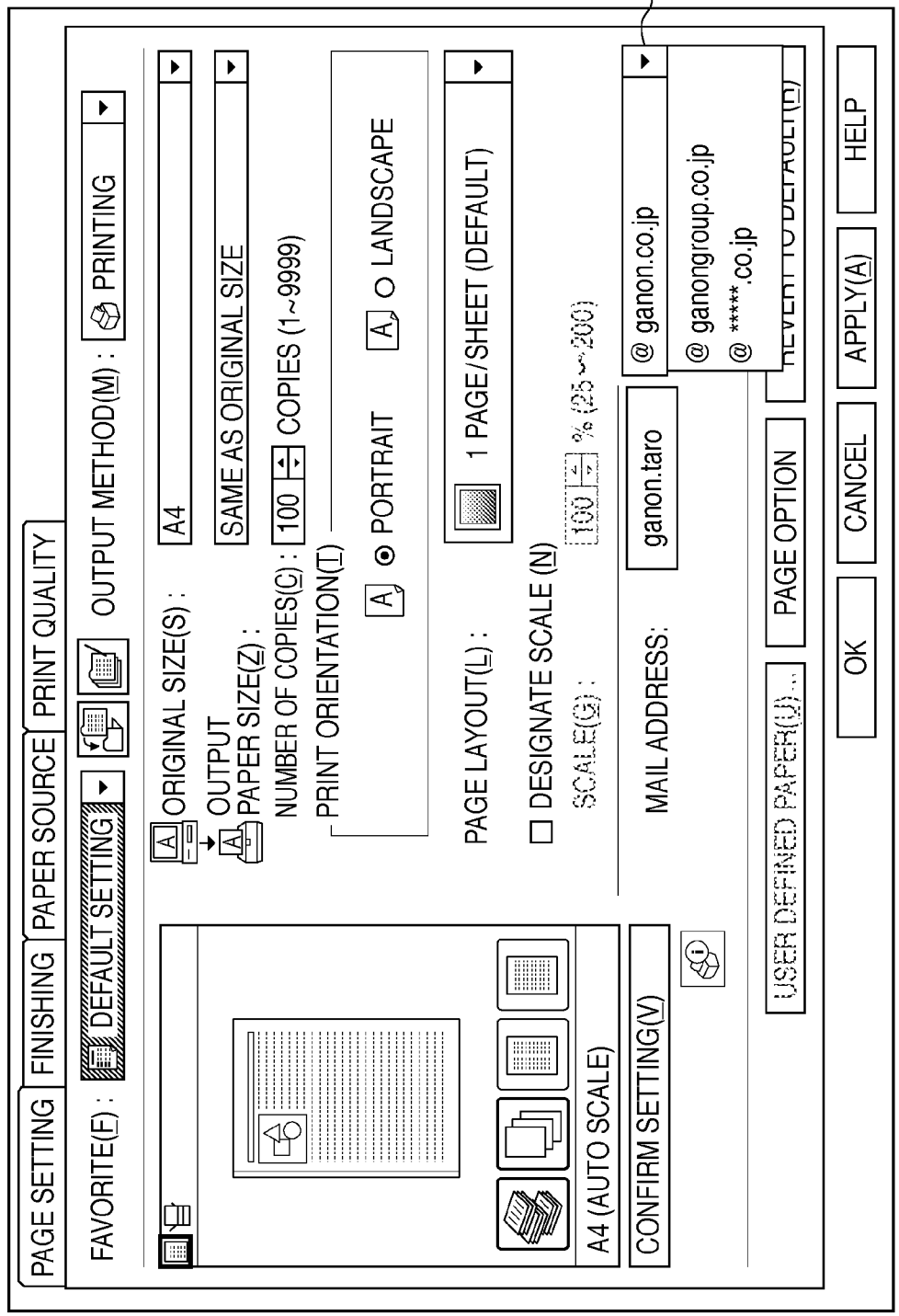
FIG. 13 is a view showing an example of a setting screen which is displayed on a client PC 201 according to the second embodiment and is used to make print settings.

A setting screen, which is displayed on the client PC 201 and is used to make print settings, will be described below with reference to FIG. 13. A mail address 1301 is used to set a mail address to which the image forming apparatus 100 notifies unique URL information required to execute printing when a print job is determined as a storage job. A domain is set by acquiring domain information registered in the device, displaying the acquired domain information on a pull-down menu, and prompting the user to select a domain. In this embodiment, when the user designates a bookbinding job as a storage target job in print job mail acceptance settings of the image forming apparatus 100 shown in FIG. 5 and sets "staple" as an exhaust method 601 in FIG. 6, it is indispensable to input the mail address 1301 upon execution of a print job.

<Transmission Packet>

Figure 14:
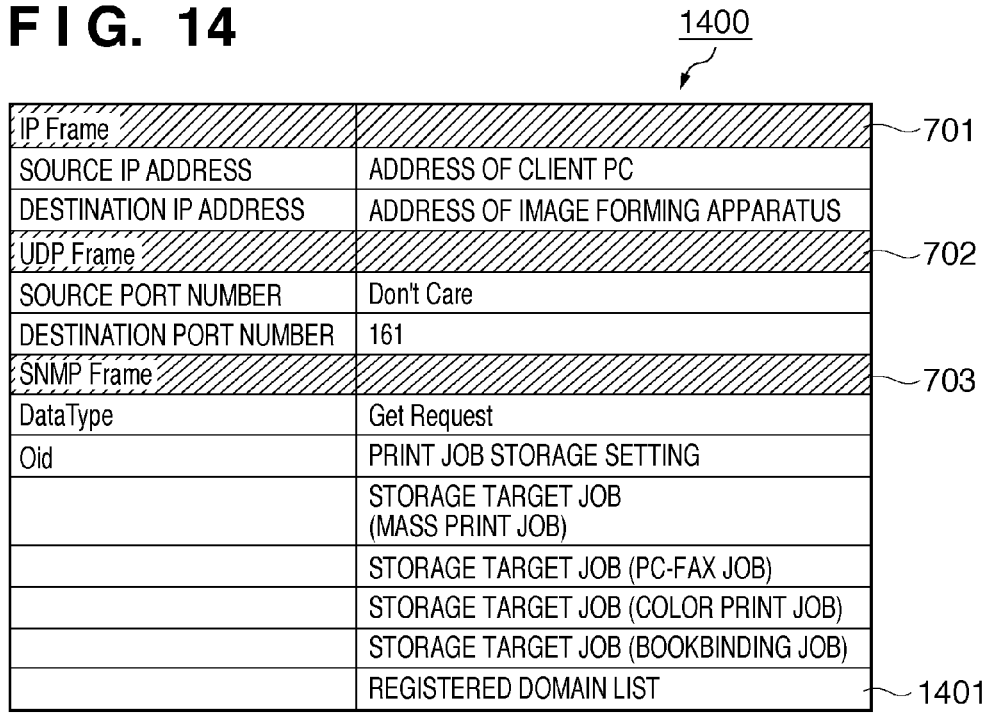
FIG. 14 is a view showing an example of an SNMP request packet 1400 according to the second embodiment.
Figure 15:
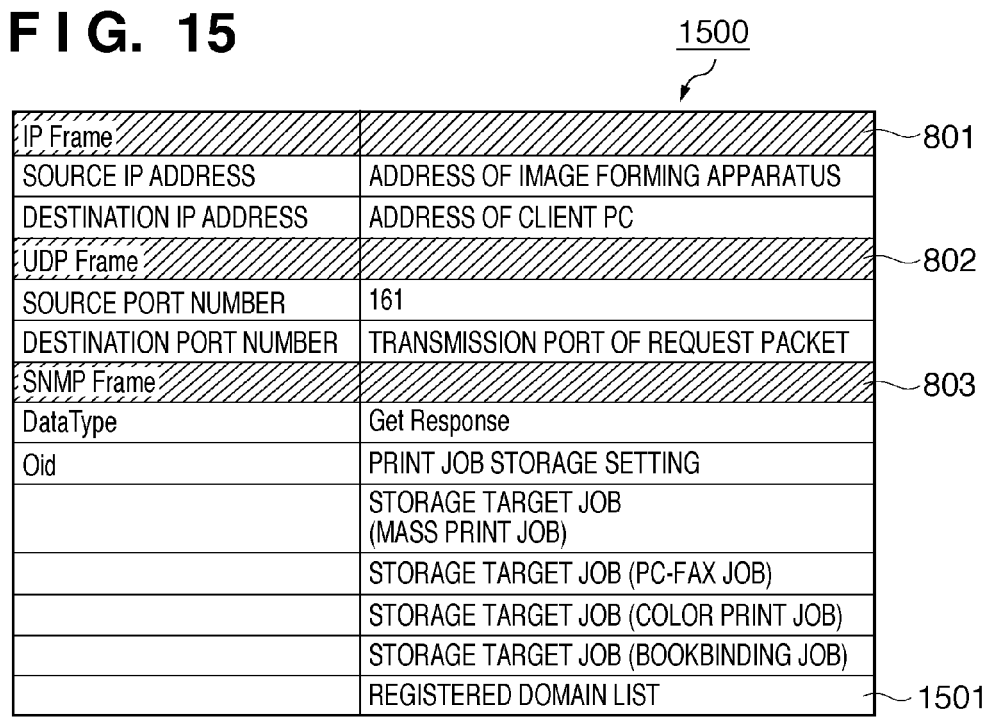
FIG. 15 is a view showing an example of an SNMP response packet 1500 according to the second embodiment.

The configurations of packets exchanged between the image forming apparatus 100 and an external apparatus (for example, the client PC 201) will be described below with reference to FIGS. 14 and 15. FIG. 14 shows an example of an SNMP request packet transmitted when the client PC 201 acquires print job storage settings of the image forming apparatus 100. Only a difference from the SNMP request packet 700 shown in FIG. 7 will be described. As shown in FIG. 14, a registered domain list item 1401 is added to an SNMP Frame 703 in an SNMP request packet 1400. FIG. 15 shows an example of an SNMP response packet transmitted when the image forming apparatus returns the print job storage settings to the client PC 201. As shown in FIG. 15, in an SNMP response packet 1500, a registered domain list item 1501 is added as in the SNMP request packet 1400 compared to the SNMP response packet 800.

<E-Mail>

An e-mail message 1600 to be transmitted by the image forming apparatus 100 to notify the generated URLs will be described below with reference to FIG. 16. As shown in FIG. 16, the e-mail message 1600 includes a URL (second URL) 905 used to discard a print job, as unique URL information which is generated by the URL creation unit 306 and is associated with the job, in addition to the configuration of the e-mail message 900. When the user selects and accesses the URL 905, he or she can discard the job. On the other hand, when the user selects and accesses a URL (first URL) 904, he or she can execute printing of the job. In this way, in the image forming apparatus according to this embodiment, when the user is notified of an e-mail message associated with a print job that he or she does not know, the user can discard that job by selecting the URL 905.

<Registration Screen>

FIG. 17 shows an example of a registration screen 1700 of a domain name as a job print target, which is displayed on a UI screen of the image forming apparatus 100. The registration screen 1700 include a delete button 1701 and add button 1702 of a domain name, and a domain name selection area 1703. The selection area 1703 selectably displays the currently registered domain names. When the user presses the add button 1702, he or she can add a new domain name. When the user selects a domain name displayed on the selection area and then presses the delete button 1701, he or she can delete the selected domain name. A new domain name can be added as long as the number of domains that can be registered is not exceeded.

As described above, in the image forming apparatus according to this embodiment, upon reception of a print job, when the domain name of a mail address included in the print job does not match the registered domain name, the print job is discarded. If the domain name matches the registered domain name, that job is temporarily saved. Furthermore, the image forming apparatus describes a URL required to execute the print job and that required to discard the print job in an e-mail message that inquires the user as to whether or not to execute the print job. Then, the user can discard a print job that he or she does not know. As described above, this image forming apparatus can reduce a storage time period of an unauthorizedly requested print job in the memory, thus effectively using the memory resources.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2009-070985 filed on Mar. 23, 2009 and No. 2009-288421 filed on Dec. 18, 2009, which are hereby incorporated by reference herein in their entirety.

What is claimed is:

1. An image forming apparatus constructed for connection to a firewall that restricts accesses from an external network via a network, and comprises a Web server, comprising:
  a storage unit that temporarily stores a print job which is received from an external apparatus on the network in a memory of the image forming apparatus;
  a creation unit that creates a URL which is uniquely assigned to the print job and is required to access the Web server;
  a transmission unit that transmits the created URL to an e-mail address which is extracted from the received print job;
  a detection unit that detects an access to the created URL; and
  an execution unit that controls a printing unit of the image forming apparatus to execute the temporarily stored print job under a condition that the access to the URL is detected.

2. The apparatus according to claim 1, further comprising:
  a timing unit that times a time period elapsed since the creation unit creates the URL; and
  a discard unit that discards the temporarily stored print job when a predetermined time period timed by the timing unit elapses before the detection unit detects the access to the URL.

3. The apparatus according to claim 1, further comprising:
  a setting unit that sets a job type as a storage target based on a user input, which is input via an operation unit of the image forming apparatus;
  a determination unit that determines whether or not a print job received from the external apparatus has the set job type as the storage target; and
  a control unit that controls the storage unit to temporarily store the print job when it is determined that the print job has the set job type as the storage target, and controls the printing unit to print the print job when it is determined that the print job does not have the set job type as the storage target.

4. The apparatus according to claim 1, wherein the detection unit detects only an access from an IP address, which is set in advance.

5. The apparatus according to claim 3, wherein the job type includes a job having the number of pages larger than the predetermined number of pages, a job that FAX-transmits a received print job, a job that executes color printing, and a job that executes bookbinding after printing.

6. An image forming system in which an image forming apparatus comprising a Web server, an information processing apparatus, and a firewall are connected via a network,
  the information processing apparatus comprising
  a unit that requests a print job to the image forming apparatus, and
  a unit that accesses information of a URL transmitted from the image forming apparatus;
  the image forming apparatus comprising
  a storage unit that temporarily stores the print job received from the information processing apparatus in a memory of the image forming apparatus,
  a creation unit that creates a URL which is uniquely assigned to the print job and is required to access the Web server,
  a transmission unit that transmits the created URL to an e-mail address which is extracted from the received print job,
  a detection unit that detects an access to the transmitted URL, and
  an execution unit that controls a printing unit of the image forming apparatus to execute the temporarily stored print job under a condition that the access to the URL is detected; and
  the firewall comprising
  a prohibition unit that prohibits an access to the URL from an external network connected to the network.

7. A method of controlling an image forming apparatus constructed for connection to a firewall that restricts accesses from an external network via a network, and comprises a Web server, comprising:
  temporarily storing a print job which is received from an external apparatus on the network in a memory of the image forming apparatus;
  creating a URL which is uniquely assigned to the print job and is required to access the Web server;
  transmitting the created URL to an e-mail address which is extracted from the received print job;
  detecting an access to the created URL; and
  controlling a printing unit of the image forming apparatus to execute the temporarily stored print job under a condition that the access to the URL is detected.

8. A method of controlling an image forming system in which an image forming apparatus comprising a Web server, an information processing apparatus, and a firewall are connected via a network,
  the information processing apparatus comprising:
  requesting a print job to the image forming apparatus, and
  accessing information of a URL transmitted from the image forming apparatus;
  the image forming apparatus comprising:
  temporarily storing the print job received from the information processing apparatus in a memory of the image forming apparatus,
  creating a URL which is uniquely assigned to the print job and is required to access the Web server,
  transmitting the created URL to an e-mail address which is extracted from the received print job,
  detecting an access to the transmitted URL, and
  controlling a printing unit of the image forming apparatus to execute the temporarily stored print job under a condition that the access to the URL is detected; and
  the firewall comprising:
  prohibiting an access to the URL from an external network connected to the network.

9. An image forming apparatus constructed for connection to a firewall that restricts accesses from an external network via a network, and comprises a Web server, comprising:
  a determination unit that determines whether or not a print job received from an external apparatus on the network is temporarily stored in a memory of the image forming apparatus;

a storage unit that temporarily stores the print job in the memory when the determination unit determines that the received print job is stored in the memory of the image forming apparatus;

a discard unit that discards the print job when the determination unit determines that the received print job is not stored in the memory of the image forming apparatus;

a creation unit that creates URLs which are uniquely assigned to the print job, are required to access the Web server, and include a first URL required to execute the print job, and a second URL required to discard the print job;

a transmission unit that transmits the created URLs to an e-mail address which is extracted from the received print job;

a detection unit that detects an access to the created first URL and the second URL; and an execution unit that discards the temporarily stored print job under a condition that an access to the second URL is detected, and controls a printing unit of the image forming apparatus to execute the temporarily stored print job under a condition that an access to the first URL is detected.

10. The apparatus according to claim 9, further comprising:

a memory unit that stores a domain name which is included in the main address and permits printing, wherein the determination unit determines that the received print job is stored in the memory of the image forming apparatus when the domain name included in the mail address is stored in the memory unit, and determines that the received print job is not stored in the memory of the image forming apparatus when the domain name is not stored in the memory unit.

11. A method of controlling an image forming apparatus constructed for connection to a firewall that restricts accesses from an external network via a network, and comprises a Web server, comprising:

determining whether or not a print job received from an external apparatus on the network is temporarily stored in a memory of the image forming apparatus;

temporarily storing the print job in the memory when it is determined in the determining that the received print job is stored in the memory of the image forming apparatus;

discarding the print job when it is determined in the determining that the received print job is not stored in the memory of the image forming apparatus;

creating URLs which are uniquely assigned to the print job, are required to access the Web server, and include a first URL required to execute the print job, and a second URL required to discard the print job;

transmitting the created URLs to an e-mail address which is extracted from the received print job;

detecting an access to the created first URL and the second URL; and discarding the temporarily stored print job under a condition that an access to the second URL is detected, and controlling a printing unit of the image forming apparatus to execute the temporarily stored print job under a condition that an access to the first URL is detected.

12. A non-transitory computer readable storage medium storing a program for causing a computer to execute the method defined by claim 7.

13. A non-transitory computer readable storage medium storing a program for causing a computer to execute the method defined by claim 8.

14. A non-transitory computer readable storage medium storing a program for causing a computer to execute the method defined by claim 11.

* * * * *